United States Patent Office 2,957,910
Patented Oct. 25, 1960

2,957,910

PROCESS FOR PREPARING UREAS

John A. Patterson, Fishkill, N.Y., assignor to Texaco Inc., a corporation of Delaware No Drawing. Filed Dec. 26, 1958, Ser. No. 782,999

4 Claims. (Cl. 260—553)

This invention relates to a process for preparing ureas from carbon monoxide and ammonia or a substituted ammonia using moderate conditions in a reaction zone fed with sulphureous substance. Urea is useful as a fertilizer and as a reactant for making plastics and resins. Substituted ureas are useful for making weed killers and moth-proofing agents.

Heretofore it has been proposed to react carbon monoxide with ammonia or a substituted ammonia in the presence of elemental sulfur in a reaction zone to make ureas. In order to induce solution of the sulfur in the reaction mixture it is conventional to use some hydrogen sulfide also. Another conventional process calls for the use of carbonyl sulfide instead of elemental sulfur. Still other conventional processes react ammonia with carbon dioxide to make urea.

My process has the advantage of employing as a hydrogen accepter substance sulphureous materials many of which are normally liquids and most of which are readily soluble under ordinary conditions in the conventional liquid reaction vehicles used in preparation of ureas from ammonia or a substituted ammonia and carbon monoxide. This simplifies reactor feeding problems. A further advantage of my process is that the yield of ureas is substantially insensitive to dilution of the carbon monoxide feed, and this does not appear to be the case when elemental sulfur, with a small amount of solubilizing hydrogen sulfide, is used as hydrogen accepter. The process also uses milder conditions than the conventional syntheses of urea from ammonia and carbon dioxide, and it does not require the expense of producing an intermediate such as carbonyl sulfide.

Broadly, my improvement in a process of the type described comprises supplying to the reaction zone as the sole sulphureous material a hydrocarbyl polysulfide. By a polysulfide I mean a compound containing at least one additional sulfur atom more than the corresponding disulfide. Ordinarily, there will be 3 to 5 sulfur atoms in the polysulfides especially useful for the practice of my process. Suitably the polysulfide will be readily soluble in the reaction vehicle at ordinary conditions and can be fed to the reactor as a solute in the vehicle. The useful polysulfides have sulfur-to-sulfur bonding. Such polysulfides can be made, for example, from disulfides by the process which comprises reacting the disulfide with elemental sulfur in the presence of an activated bauxite catalyst at a temperature in the range of 250° to 400° F. and at a pressure in the range of 200 to 800 p.s.i.g. Other hydrocarbyl polysulfides, both symmetric and asymmetric are available from refinery sweetening operations of hydrocarbons. Polysulfides can be made generally by oxidizing a mercaptan to a disulfide, and then further reacting the disulfide with elemental sulfur.

Suitable specific polysulfides useful in the practice of my process include: dialkyl polysulfides such as a di-n-butyl polysulfide; dialkenyl polysulfides such as a diallyl polysulfide; dicycloalkyl polysulfides such as a dicyclohexyl polysulfide; diaryl polysulfiides such as a diphenyl polysulfiide; diaralkyl polysulfides such as a di-p-tolyl polysulfide; alkaryl polysulfides such as a dibenzyl polysulfide; and heterocyclic polysulfides such as 4,4-dimethyl-1,2-polythiacyclopentane.

Mercaptans are formed as by-products in my synthesis of urea from ammonia or a substituted ammonia and carbon monoxide using polysulfides. Hydogen sulfide also is formed, and in some instances a portion of the polysulfide is reduced to the disulfide. Conventional processing steps for converting the hydrogen sulfide to sulfur and the mercaptan to disulfide, then reacting these intermediates to obtain polysulfide for reuse, can be practiced. However, these sulfur-containing materials ($H_2S$, mercaptan, and disulfide) can all be oxidized directly with air in the presence of activated bauxite catalyst to polysulfide as described above. Alternatively, the mercaptans can be reoxidized to disulfides using an oxidant such as tetracyanoethylene, and the polysulfides formed from the disulfide reaction product. The tetracyanoethylene is converted into tetracyanoethane in this recovery scheme, and it can then be reconverted to tetracyanoethylene by oxidation with ferric chloride or lead dioxide.

Reaction time can be from about a minute to as long as 10 hours or even more, and preferably it is from about 10 minutes to about 4 hours for making urea itself and about 3–8 hours for making a substituted urea. In continuous systems the reaction time is calculated as an average reaction time, and it is based then on the volumetric feed rate of the materials other than the ones fed in gaseous state to the reactor and the empty reactor space.

The process is practiced in the presence of a substantially inert liquid vehicle such as methanol, ethanol, isopropanol or other lower ($C_1$—$C_8$) alkanol, petroleum ether, benzene, isopropyl ether, trichloroethylene, aqueous $C_1$—$C_3$ alkanols, ethylene glycol, 2-methoxyethanol-1, tetrahydrofurfural alcohol, and formamide. The inert vehicle broadly composes about 40 to about 95 weight percent of the reaction mixture as charged, and preferably it is from 70 to 90 weight percent of such mixture. The pressure in the operation should be at least sufficient to suppress substantial volatilization of the liquid vehicle employed. Suitably, the pressure in my process is from 200–2000 p.s.i.g. and preferably it will be between 300 and 1000 p.s.i.g. It is especially advantageous that the reaction vehicle be a solvent at reaction conditions employed for the urea being made, thereby eliminating some solids handling problems in the reactor.

When ammonia is used the product is urea (carbamide). Substituted ammonias yield correspondingly substituted ureas. Suitable amines for the process are hydrocarbyl primary monoamines such as isobutylamine, n-decylamine, and ethylamine. Generally the alkyl primary amines having up to 10 carbon atoms are the most suitable substituted ammonia to use, but use of hydrocarbonyl primary monoamines having ethylenic unsaturation, or even amine alcohols such as monoethanolamine, also are reactants conceivable for my process.

Broadly the temperature for the operation should be between about 150° and about 300° F. When ammonia is the reactant I prefer to use a temperature between about 180° and 250° F. Generally the use of substituted ammonia reactants calls for use of a higher temperature than does the reaction when ammonia itself is employed.

While the carbon monoxide reactant can be concentrated, e.g. 90 volume percent or higher, carbon monoxide gas streams that are comparatively dilute can also be used because my process is substantially insensitive to ill effects from such dilution; (this is not the case when elemental sulfur and solubilizing H₂S are used). Thus, in my process the CO stream can contain 0.2–4 volume parts of carbon monoxide per volume part of hydrogen, nitrogen or other diluent. A suitable CO gas can be generated by the combustion of metallurgical coke with air, or by the partial oxidation of carbon containing substance with oxygen or air to make substantial quantities of hydrogen in connection with the production of CO, a conventional synthesis gas. The carbon monoxide feed also can contain substantial amounts of carbon dioxide, e.g. upwards to 25% or even more as well as carbonyl sulfide, hydrogen sulfide, and associated sulphureous impurities which are frequently present in carbon monoxide-bearing streams; these impurities need not be cleansed from the gas. The comparative insensitivity of my process to diluents in the CO makes it especially economical.

The mol ratio of ammonia or substituted ammonia: carbon monoxide used in my process can be between about 10:1 and about 0.1:1 or even lower, and preferably it will be between about 0.1:1 and about 0.5:1 for efficiency and economy in the practice of the process. The ratio of ammonia or substituted ammonia:polysulfide will be generally broadly between about 0.1 and 10 gram mols of ammonia per gram atom of sulfur in the polysulfide; preferably a ratio of about 0.5–2.5 gram mols of ammonia per gram atom of sulfur in the polysulfide is used. Suitable materials of construction for use in my process include corrosion resisting ones such as an austenitic stainless steel.

In one aspect of my invention the polysulfide can be formed in situ by supplying the corresponding disulfide and elemental sulfur to the reaction vessel, and carrying out the reaction as though a preformed polysulfide were being charged. This is a less preferred embodiment of my invention than the charging of preformed polysulfide because, as shown in examples hereinafter, the yield from such operation suffers more than it does in a corresponding operation using preformed polysulfide when a dilute carbon monoxide gas stream is used (but nevertheless the insensitivity of process to dilute carbon monoxide is still substantially superior to that experienced when sulfur is used as the hydrogen acceptor).

The following examples show how my process has been practiced but they should not be construed as limiting the invention. All percentages given are weight percentages unless otherwise expressly stated. In the run using dilute carbon monoxide (synthesis gas) the pressure was increased over that used in a comparable run using pure carbon monoxide in order to make the partial pressures of carbon monoxide in the reaction vessel comparable to each other in the cases compared. The reactor used in all the runs was a stirred batch pressure vessel made of austenitic stainless steel and having 1535 cc. volume.

*Example 1.*—The reactor was charged with 65 grams of ammonia, 139 grams of benzyl polysulfide having 40.75% sulfur, 600 cc. of methanol, and carbon monoxide gas to maintain the pressure in the reactor at 500 p.s.i.g. The reactor was kept at about 243° F. for 3 hours.

At the end of the run the reactor was cooled, vented to atmosphere, and the product mixture removed. A small sample of the reaction mixture was taken for ammonia analysis, and the remainder was filtered. The filtrate was then distilled, the pot temperature not being allowed to exceed 185–194° F. Solid product was allowed to crystallize from the distilland residue. 51.64 grams of urea was obtained from the run to give a weight yield of 79.5% based on ammonia charged.

*Example 2.*—In a similar run differing only from the run described in Example 1 in that the carbon monoxide gas was a dilute synthesis gas containing 37.8 mol percent CO and 62.2 mol percent hydrogen, and the pressure was 1500 p.s.i.g. instead of 500 to make the partial pressure of carbon monoxide approximately equal to that in the run shown in Example 1, 56.7 grams of urea was obtained for a weight yield based on ammonia charged of 87.3%.

*Example 3.*—The reactor was charged with 65 grams of ammonia, 105 grams of tertiary butyl polysulfide having 55.44% sulfur, 600 cc. of methanol, and carbon monoxide gas to maintain the pressure in the reactor at about 500 p.s.i.g. The reactor was kept at about 242° F. for 3 hours.

At the end of the run the reactor was cooled, vented to atmosphere, and the product mixture removed. The product mixture was filtered, then distilled to a pot temperature of about 185–194° F. Solid product was allowed to crystallize from the distilland residue. In this run 72.5 grams of urea was obtained for a weight yield of 111% based on ammonia charged.

*Example 4.*—This run was conducted in the same way as the run described in Example 3 except that dilute carbon monoxide (37.8 mol percent CO and 62.2 mol percent hydrogen) was used, the pressure was 1500 p.s.i.g. to make the partial pressure of CO about the same as in the preceding example, and the temperature was about 247° F. 70.6 grams of urea was obtained for a weight yield based on ammonia charged of 108.5%. This yield is only off 2.35% from the yield of the preceding example; comparison of the two runs shows the comparative insensitivity of my process to a dilute carbon monoxide feed.

In this connection in a pair of runs wherein the liquid reaction mixture was 60 grams of ammonia, 44 grams of elemental sulfur, 6 grams of hydrogen sulfide (to assist in dissolving the elemental sulfur) and 600 cc. of methanol and the runs were made under comparable conditions of temperature and pressure (195° F. for 3 hours at 250 p.s.i.g. in the run using the pure CO, and 201° F. for 4 hours at 750 p.s.i.g. using a synthesis gas of 37.8 mol percent CO and 62.2 mol percent hydrogen). The weight yield of urea obtained based on ammonia charged was 117.2% when the pure CO was used, and only 53.9% when the dilute CO was used. In other words, the yield was off by 54% when the CO gas was dilute.

*Example 5.*—A pair of runs were made each using the following reaction mixtures: 65 grams of ammonia, 73 grams of tertiary butyl disulfide plus 33 grams of elemental sulfur, and 600 cc. of methanol. The first run was maintained for 3 hours at 241° F. using pure CO to keep about 500 p.s.i.g. pressure in the reaction vessel. The second run was maintained at 243° F. for 3 hours using a synthesis gas of 37.8 mol percent CO and 62.2 mol percent hydrogen to maintain a pressure of 1500 p.s.i.g. in the reaction vessel, thereby making the partial pressures of the carbon monoxide in the reaction vessel in each run comparable with each other.

The reaction products were worked up in a manner similar to that described in Example 1. In the run using pure carbon monoxide 48 grams of urea was obtained for a weight yield based on ammonia charged of 74%. In the companion run 39.3 grams of urea was obtained for a weight yield of 60.5 percent based on ammonia charged. This represents a falling off of only about 18% when dilute carbon monoxide was used.

I claim:

1. In a process for preparing ureas from carbon monoxide and a compound selected from the group consisting of ammonia and alkyl primary monoamines having up to 10 carbon atoms at a temperature between about 150 and 300° F., at a pressure from 200 to 2000 p.s.i.g. and at a mol ratio of compound: carbon monoxide between about 10.1 and 0.1:1 in a reaction zone containing inert liquid reaction vehicle, said vehicle composing between 40 and 95 wt. percent of the reaction mixture, the improvement which comprises supplying to the reaction zone a polysulfide having 3 to 5 sulfur atoms selected from the group consisting of di-n-butyl polysulfide, di-tertiary butyl polysulfide, diallyl polysulfide, dicyclohexyl polysulfide, diphenyl polysulfide, di-p-toyl polysulfide, dibenzyl polysulfide, and 4,4-dimethyl-1,2-polythiacyclopentane in a mol ratio of between about 0.1 and 10 grams per mol of said compound per gram atom of sulfur in said polysulfide.

2. The process of claim 1 wherein the carbon monoxide supplied to said reaction zone is dilute.

3. The process of claim 1 wherein said polysulfide is a di-tertiary butyl polysulfide.

4. The process of claim 1 wherein the said polysulfide is dibenzyl polysulfide.

References Cited in the file of this patent

UNITED STATES PATENTS

| | | |
|---|---|---|
| 2,857,430 | Applegath et al. | Oct. 21, 1958 |
| 2,857,431 | Glass et al. | Oct. 21, 1958 |

OTHER REFERENCES

Houben et al.: Methoden der Org. Chem., vol. 9, p. 54 (1955).